(12) United States Patent
Demel et al.

(10) Patent No.: US 11,643,282 B2
(45) Date of Patent: May 9, 2023

(54) METHOD AND DEVICE FOR BUFFERING CONTAINERS

(71) Applicant: Krones AG, Neutraubling (DE)

(72) Inventors: Alexander Demel, Obertraubling (DE);
Christian Holzer, Schierling (DE);
Franz Lautenschlager, Barbing (DE);
Christian Richter, Aufhausen (DE);
Konrad Senn, Alteglofsheim (DE);
Peter Muehlstein, Koefering (DE);
Torsten Kilgenstein, Manching (DE);
Helmut Schuesslburner, Straubing (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 17/355,034

(22) Filed: Jun. 22, 2021

(65) Prior Publication Data
US 2021/0395021 A1 Dec. 23, 2021

(30) Foreign Application Priority Data
Jun. 22, 2020 (DE) ..................... 10 2020 207 680.4

(51) Int. Cl.
*B65G 47/51* (2006.01)
(52) U.S. Cl.
CPC ...... *B65G 47/5131* (2013.01); *B65G 47/5113* (2013.01); *B65G 2201/0235* (2013.01)
(58) Field of Classification Search
CPC ............ B65G 47/5131; B65G 47/5113; B65G 2201/0244; B65G 2201/0235

USPC ............................................ 198/347.1, 347.4
See application file for complete search history.

(56) References Cited

U.S. PATENT DOCUMENTS

| | | | | |
|---|---|---|---|---|
| 4,635,784 A * | 1/1987 | Bourgeois | .......... | B65G 47/5109 198/429 |
| 5,267,821 A * | 12/1993 | Bodart | ..................... | B42C 19/08 412/14 |
| 6,609,605 B1 * | 8/2003 | Linder | ............... | B65G 47/5104 198/347.4 |

(Continued)

FOREIGN PATENT DOCUMENTS

| | | |
|---|---|---|
| DE | 10151708 A1 | 5/2003 |
| DE | 102018211859 A1 | 1/2020 |

(Continued)

*Primary Examiner* — James R Bidwell
(74) *Attorney, Agent, or Firm* — McCoy Russell LLP

(57) ABSTRACT

A method and a device for buffering containers grouped in a single row in a filling system are described. For this purpose, the containers are entered into storage on at least one infeed conveyor belt in the infeed direction, moved in a single row onto a transversely adjoining buffer area by rail-guided and individually driven shuttles with row pushers in a buffering direction running transverse to the infeed direction, and are removed from storage on at least one outfeed conveyor belt transversely adjoining in the buffering direction. Due to the fact that the row pushers receive the containers in a single row in a guide channel formed/defined by an anterior row guide leading in the buffering direction and by a trailing posterior row guide, the groups of containers can be moved in the buffering direction and positioned precisely, quickly and secured against falling over without back pressure.

20 Claims, 13 Drawing Sheets

(56) References Cited

U.S. PATENT DOCUMENTS

| | | | | |
|---|---|---|---|---|
| 6,782,990 B2 * | 8/2004 | Joutsjoki | ................ | B65G 47/71 |
| | | | | 198/606 |
| 7,124,558 B2 * | 10/2006 | Weaver | .................... | B65B 5/08 |
| | | | | 53/247 |
| 9,505,562 B2 * | 11/2016 | Petrovic | ................. | B65G 37/00 |
| 2010/0108464 A1 * | 5/2010 | Davi | ................. | B65G 47/5109 |
| | | | | 198/347.1 |
| 2015/0291367 A1 * | 10/2015 | Petrovic | ................. | B65G 37/00 |
| | | | | 198/347.1 |
| 2019/0241373 A1 | 8/2019 | Eisenberg et al. | | |

FOREIGN PATENT DOCUMENTS

| | | | | | |
|---|---|---|---|---|---|
| FR | 3075768 | A1 | 6/2019 | | |
| WO | 2016200751 | A1 | 12/2016 | | |
| WO | 2019228901 | A1 | 12/2019 | | |
| WO | 2020094287 | | * | 5/2020 | ............. B65G 47/51 |

\* cited by examiner

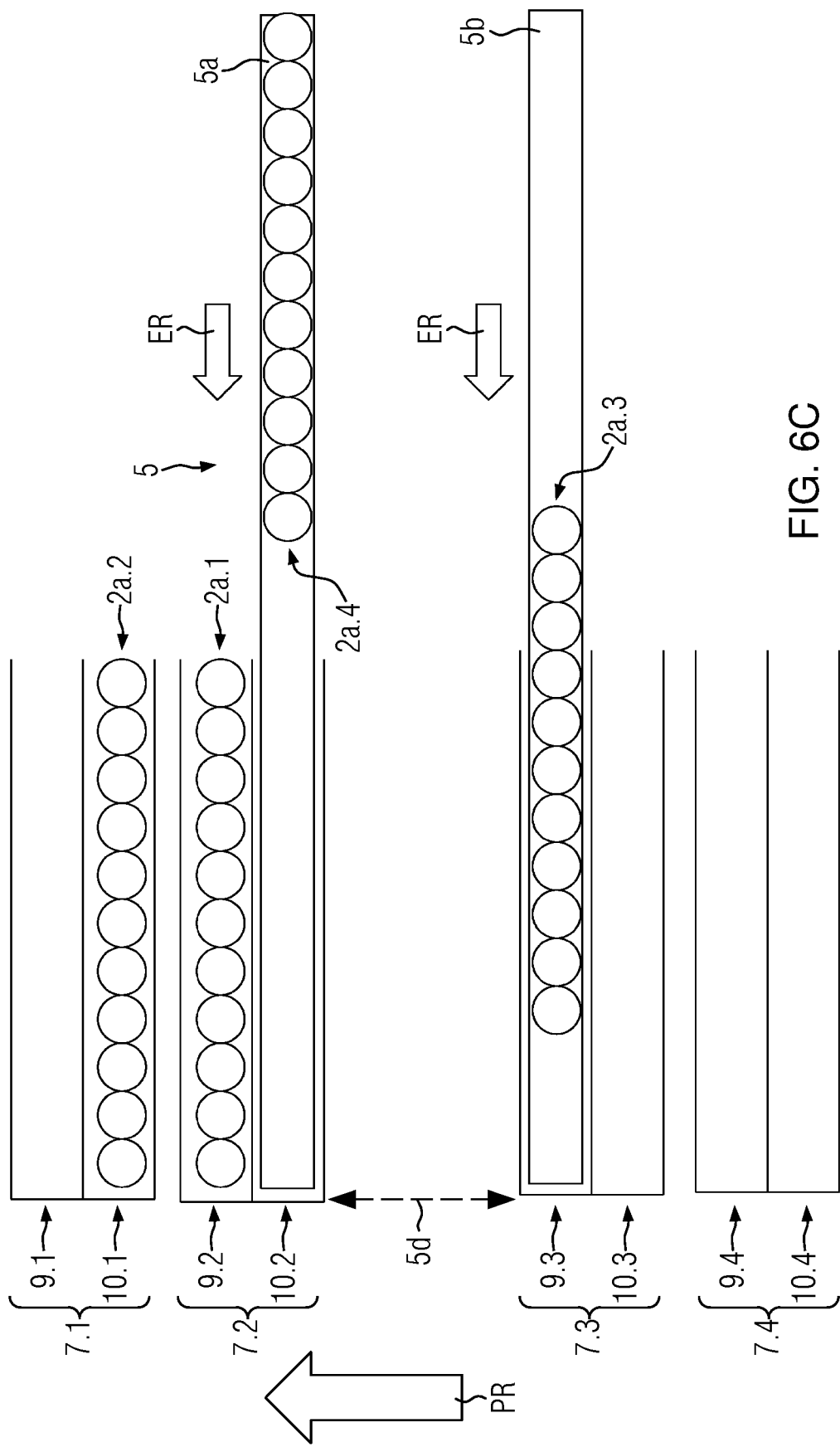

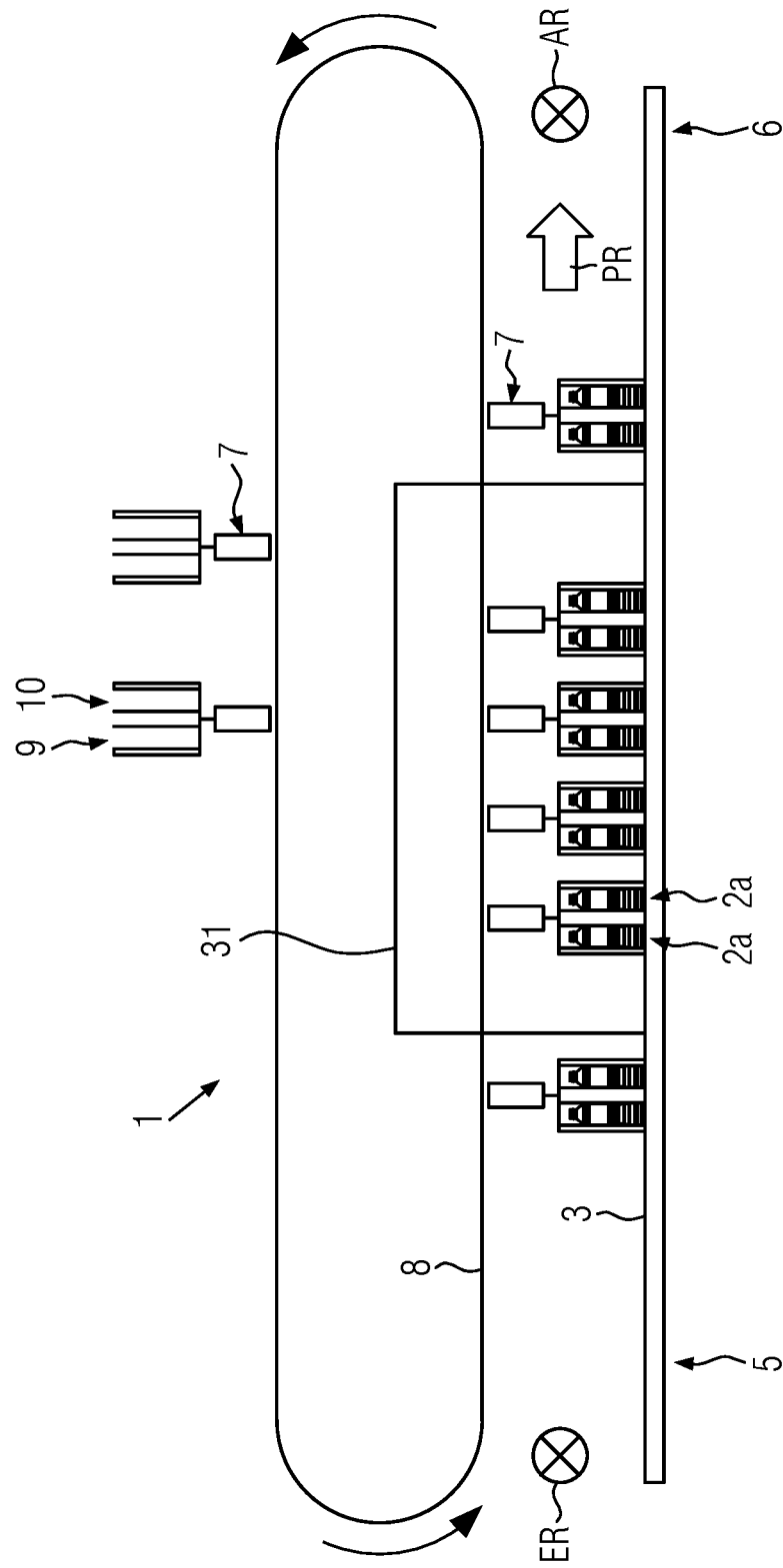

METHOD AND DEVICE FOR BUFFERING CONTAINERS

CROSS REFERENCE TO RELATED APPLICATION

The present application claims priority to German Patent Application No. 10 2020 207 680.4 filed on Jun. 22, 2020. The entire contents of the above-listed application is hereby incorporated by reference for all purposes.

TECHNICAL FIELD

The invention relates to a method and a device for buffering containers in a container treatment plant, in particular a filling system.

BACKGROUND AND SUMMARY

A generic method and a generic device are known from DE 10 2018 211859 A1. According thereto, single-row groups of containers, for example, consisting of beverage bottles, can be pushed over a buffer area without back pressure by way of transversely aligned row pushers. In connection with a container infeed and a container outfeed each oriented transverse to the buffering direction, a buffer device is thus obtained which can buffer container flows with efficient use of space, for example, according to the first-in-first-out principle.

However, the process when entering the groups of containers into storage at the transition from the container infeed to the buffer area, i.e., when the row pushers take over the groups of containers, has proven to be particularly disadvantageous. For example, in order to optimize the entry process into storage, it was proposed to move the groups of containers in the infeed region transversely along a sawtooth-shaped line in front of the approaching row pushers in order to facilitate the takeover by the row pushers. This is comparatively complex and inflexible with regard to the container formats to be processed. Furthermore, only comparatively low advance speeds of the row pushers are possible when the groups of containers are taken over and when they are subsequently pushed forward in the buffering direction, in order to prevent the containers from falling over.

There is therefore a demand for methods and devices improved in this regard for buffering containers grouped in a single row in a container treatment system/filling system.

The object posed is satisfied by example methods disclosed herein.

The method is used to buffer containers grouped in as single row, in particular bottles, in a container treatment system, in particular a filling system, in particular substantially without mutual back pressure of the containers. For this purpose, the containers are entered into storage on at least one infeed conveyor belt in the infeed direction, moved in a single row onto a transversely adjoining buffer area by rail-guided and individually driven shuttles with row pushers in a buffering direction running transverse to the infeed direction while maintaining a spatially separated single-row arrangement, i.e. in spatially separated buffer lines, and are removed from storage on at least one outfeed conveyor belt transversely adjoining in the buffering direction.

According to the invention, the row pushers receive the containers respectively in a single row in a guide channel formed/defined by an anterior row guide leading in the buffering direction and a trailing posterior row guide.

The guide channel therefore runs transverse to the buffering direction. In this way, the containers/groups of containers can be moved and positioned comparatively precisely in the buffering direction without back pressure, i.e., in spatially separated buffer lines.

When accelerating and moving in the buffering direction, the containers/groups of containers are pushed by the posterior row guide and, if necessary, additionally guided by the anterior row guide and secured against falling over. When decelerating, the containers/groups of containers run onto the anterior row guide and can finally be stopped by the latter and, if necessary, be additionally guided by the posterior row guide and secured against falling over. The row pushers therefore enable relatively high speeds of the containers/groups of containers when moving on the buffer area, on the infeed conveyor belt, and on the outfeed conveyor belt.

The containers/single-row groups of containers can be stopped by the shuttles basically at any partial section of the buffer area, depending on how full the buffer area is. A sequence of row pushers each filled with containers/groups of containers can then, for example, move up step-by-step to/onto the outfeed conveyor belt in the buffering direction. The containers/groups of containers are there received from the foremost row pushers from the outfeed conveyor belt transverse to the buffering direction and, depending on the advance position of the individual row pushers, are possibly distributed to different transport aisles.

A clear width of the guide channel, i.e., between the anterior and the posterior row guide, may each be adapted to a width/a diameter of the containers, in particular in a range from 40 to 150 mm. The containers/groups of containers can then be moved in the buffering direction and positioned gently, precisely, and secured against falling over with a suitable clearance between the anterior and the posterior row guide.

The adaptation of the clear width promotes relatively high accelerations/decelerations in the buffering direction of, for example, 0.2 to 0.8 m/s$^2$.

The clear width may be adjusted by way of an actuating mechanism present on the individual shuttles when the shuttle is stationary in the buffering direction.

For adjustment by machine, for example, a stationary adjustment station is suitable at which the individual shuttles are temporarily stopped and the adjustment mechanism is actuated. The clear width could also be adjusted manually by way of the adjustment mechanism.

The shuttles may each position the row pushers for receiving the containers/groups of containers above an associated infeed conveyor belt, where the respective group of containers then enters the row pusher in the guide channel between the anterior and the posterior row guide in a manner standing on the infeed conveyor belt.

In other words, to pick up the containers/groups of containers, they are only moved transverse to the buffering direction, while the associated row pusher is then temporarily substantially stationary. This enables a comparatively space-saving transfer of containers/groups of containers grouped in a single row from the infeed conveyor belt to the respective row pusher.

The buffer area may be formed to be stationary. However, it is also conceivable that at least one longitudinal section of the buffer area is movable in the buffering direction, for example, in the form of one or more conveyor belts running in the buffering direction and integrated into the buffer area.

The row pushers may run in pairs on the shuttles and in particular along a continuous rail guide. The shuttles then comprise a row pusher that is anterior in the buffering direction and one posterior one and thereby an anterior and a posterior guide channel. The guide channels can comprise a common partition wall or a similar structure. For example, the anterior row guide of the posterior row pusher/guide channel can then be identical or fixedly connected to the posterior row guide of the anterior row pusher/guide channel.

This reduces the number of shuttles required for a certain buffer capacity and favors a particularly effective use of the buffer area for pressureless moving/buffering of the containers, i.e., while maintaining their single row grouping.

The adjustment of the clear width can then also be simplified by simply changing the distance between the anterior row guide of the anterior row pusher/guide channel and the posterior row guide of the posterior row pusher/guide channel. A common actuating mechanism is then associated with both row pushers of a shuttle. This simplifies and shortens the adjustment of the clear width.

The row pushers may run upside down from the outfeed conveyor belt back to the infeed conveyor belt. This means that the row pushers/guide channels are open at the bottom in the region of the infeed conveyor belt, the buffer area, and the outfeed conveyor belt, i.e., when the containers/groups of containers are entered into storage, moved, and removed from storage, but when the shuttles return empty from the outfeed area to the infeed area, however, they are open at the top.

The respective row pushers/guide channels in the buffering direction being anterior may each be fixedly associated with a respective infeed conveyor belt being posterior when viewed in the buffering direction, and respective row pushers/guide channels being posterior are each associated with an infeed conveyor belt being anterior when viewed in the buffering direction. This means that all anterior row pushers are then populated with the containers/groups of containers in a single row by the posterior infeed conveyor belt, all posterior row pushers by the anterior infeed conveyor belt.

In order to populate both row pushers of a shuttle with containers/groups of containers, first the anterior row pusher is then populated by the posterior infeed conveyor belt and then the posterior row pusher by the anterior infeed conveyor belt.

The anterior and the posterior infeed conveyor belt may then be so far apart from one another in the buffering direction that at least one shuttle with a twin row pusher, i.e., with an anterior and a posterior row pusher, can be positioned therebetween. This serves to optimize the process for the single-row population of the row pushers with the containers/groups of containers.

A container flow, which is supplied in a single row and in particular without gaps, may be separated into the groups of containers, and they are alternately guided onto the, in particular, two infeed conveyor belts arranged consecutively in the buffering direction. This makes it possible to populate the individual row pushers with groups of containers that adjoin one another temporally without any gaps for a continuous flow of containers.

The shuttles may reach a speed of at least 0.4 m/s when approaching the infeed belts and/or when traversing empty regions of the buffer area. This enables the shuttles and row pushers to be quickly positioned in the region of the infeed belts and the shuttles and row pushers populated there with the containers/groups of containers to move up quickly over empty buffer areas.

When the shuttles move up step-by-step into filled region of the buffer area up to the outfeed belt, the shuttles may reach a speed of at least 0.1 m/s.

The containers/groups of containers may be distributed over three to twelve transport aisles connected in parallel when they are removed from storage, where the number of outfeed conveyor belts then corresponds in particular to the number of transport aisles.

This means that the row pushers/guide channels are each positioned in alignment with one of the transport aisles above the associated outfeed conveyor belt and transported away by the latter in intermittent operation through the respective transport aisle. This enables flexible association of the containers grouped as single row, for example, for a packaging machine arranged downstream.

The containers may furthermore be treated in a treatment unit arranged in the region of the buffer area, and the length of time the containers dwell there is set by driving, i.e., selectively moving and/or stopping, the shuttles with the row pushers there receiving the containers.

This enables a direct coupling of the transfer of the containers via the process section of the treatment unit and a dynamic buffering of the containers between the entry of the containers into storage and the removal therefrom.

The buffering and the treatment of the containers can thus be adjusted together, for example in batches, in order to react immediately to changes in the productivity of a higher-level container treatment system/filling system.

The device described is particularly suitable for buffering containers grouped in a single row, in particular bottles, in a filling system without back pressure and comprises a buffer area and a transport system arranged thereabove for moving the containers/groups of containers on the buffer area in a buffering direction from an infeed region with at least one infeed conveyor belt running transverse to the buffering direction to an outfeed region with at least one outfeed conveyor belt running transverse to the buffering direction, where the transport system comprises shuttles guided on rails and driven independently of one another with row pushers for moving the containers in a single row.

According to the invention, the row pushers each comprise a guide channel running transverse to the buffering direction for receiving the containers in a single row, where the guide channel is defined by an anterior row guide leading the containers and a posterior row guide trailing the containers.

The row pushers are therefore configured to guide the containers grouped in a single row on both sides in and opposite to the buffering direction in spatially separated buffer lines. The advantages described with respect to example methods disclosed herein can consequently be obtained.

The shuttles may comprise actuating mechanisms for adjusting a clear width of the guide channels, i.e., between the respective anterior and posterior row guides, in particular for adjusting a clear width of 40 to 150 mm each. This allows the row guides/guide channels to be adapted to the width/diameter of the containers to be buffered.

The transport system may comprise a stationary adjustment station for the automated actuation of the actuating mechanisms. The shuttles then temporarily stop individually in the region of the stationary adjustment station so that the latter can operate the respective actuating mechanism to adjust the clear width. In principle, the adjustment station could also be configured for manual adjustment by the operator.

The row pushers/guide channels may have a width transverse to the buffering direction of 3 to 6 m, in particular 4 to 5.5 m. This enables handling differently filled containers, for example, those for beverages, in particular depending on the weight of the individual containers. For example, in the case of large-volume container formats, the group of containers respectively received in a single row by the row pushers can be shorter than in the case of containers that are smaller in comparison. The mass to be moved by the individual shuttles can then be adapted to the performance of the shuttle drive or similar parameters.

Each shuttle may comprise two row pushers arranged consecutively in the buffering direction, each with a guide channel in the sense of a twin row pusher. Since the drive elements and guide elements of the shuttles entail a certain minimum width of the shuttles, the buffer capacity and/or the transport separation of the containers for single-row buffering can be optimized by arranging two row pushers each per shuttle.

In addition, the clear width of the guide channels can then be adjusted more easily and quickly for both row pushers of the shuttles using a common actuating mechanism than with the separate adjustment of individual row pushers. For example, only the distance between the anterior row guide of the anterior row pusher/guide channel and the posterior row guide of the posterior row pusher/guide channel is then adjusted.

The infeed region may comprise several, in particular two, infeed conveyor belts arranged consecutively in the buffering direction. For example, an infeed conveyor belt being anterior in the buffering direction can then be used to populate all posterior row pushers/guide channels with the containers/groups of containers arriving in a single row, and the posterior infeed conveyor belt can be used to populate all anterior row pushers/guide channels accordingly.

The distance between the anterior and the posterior infeed conveyor belt may then be at least as large as the width of a twin row pusher, i.e., its outer dimension when viewed in the buffering direction, in particular with the greatest possible clear width of the guide channels. A shuttle can then wait in an intermediate position between the shuttles/guide channels positioned above the infeed belts in order to thus optimize the process of entry into storage.

In principle, this would also be possible with more than two infeed conveyor belts and more than two row pushers per shuttle with corresponding distances/intermediate positions between adjacent infeed conveyor belts.

The outfeed region may comprise several intermittently driven outfeed conveyor belts arranged consecutively in the buffering direction which are associated with transport aisles running in the outfeed direction.

A cleaning element for blowing onto, squeegeeing off, wiping off and/or brushing off the buffer area may be arranged on at least one of the row pushers. In this way, the buffer area can be cleaned at suitable time intervals during operation by having the cleaning element sweep over the buffer area.

The cleaning element is, for example, a brush and/or a rubber lip fixedly mounted on the row pusher, a rotatable brush, a series of nozzles for at least one cleaning fluid or the like. The cleaning element can act as a passive element only through the relative motion of the row pusher on the buffer area, or it can be configured as an active cleaning element with its own drive.

The cleaning element can be permanently attached to the row pusher or possibly temporarily attached to the row pusher.

The cleaning element can also be supplied with a cleaning fluid which is either made available centrally in the region of the transport system or is carried along on the associated row pusher. The cleaning fluid can be, for example, water, a foaming cleaning agent, dry ice mist, compressed air, spray mist or the like.

The cleaning element could dispose of an independent motor and/or be driven by the motion of the shuttle/row pusher, for example, by way of a friction wheel.

Different and/or several cleaning elements can also be distributed over several row pushers. For example, liquid cleaning fluid can be sprayed on or otherwise applied to the buffer area by a row pusher leading in the buffering direction and it can be wiped off and/or dried by a trailing row pusher by blowing it off, squeegeeing it off or the like.

Cleaning the buffer area by way of the cleaning elements can take place at regular intervals and/or as required and/or during production interruptions.

In this way, the buffer area could also be cleaned only in sections, for example, in/at the infeed region and/or in/at the outfeed region and/or therebetween.

Furthermore, the transport system can comprise a stationary cleaning station at which the cleaning element is attached and/or enabled on the associated row pusher in particular by machine, for example, by being supplied with a cleaning fluid. For this purpose, the associated shuttle could be temporarily stopped at the cleaning station in order to carry out the corresponding assembly/enabling of the cleaning element.

By applying the cleaning element and possibly the cleaning fluid in this manner, increased hygiene conditions can be fulfilled, where the manual effort for cleaning the buffer area can be reduced, the media consumption for cleaning can be reduced compared to manual cleaning steps, and the function of the device can be reliably maintained overall.

The buffer area may comprise stationary mat chains running transverse to the buffering direction. The mat chains each comprise chain links that are strung together at joints transverse to the buffering direction. This means that the joint axes of the individual joints are substantially aligned in buffering direction PR. The mat chains serve as a stationary sliding surface and are therefore not driven in normal buffer operation to move the containers in the buffering direction.

The alignment of the mat chains transverse to the buffering direction provides the advantage that the containers are then not pushed over the joints, but are moved along the joints. This avoids unwanted swinging of the container when moved and a so-called stick-slip effect.

The chain links can compensate for changes in length, for example, due to temperature fluctuations, during buffer operation. In addition to low coefficients of friction, this is a major advantage of the mat chains over a buffer area made of plates.

BRIEF DESCRIPTION OF THE FIGURES

Example embodiments of the present disclosure are shown by way of drawings, where

FIG. 6A, FIG. 6B, FIG. 6C, FIG. 6D, and FIG. 6E show an advantageous sequence for entry into storage;

FIG. 9 shows a schematic representation of an integrated treatment unit.

DETAILED DESCRIPTION

Figure 1:
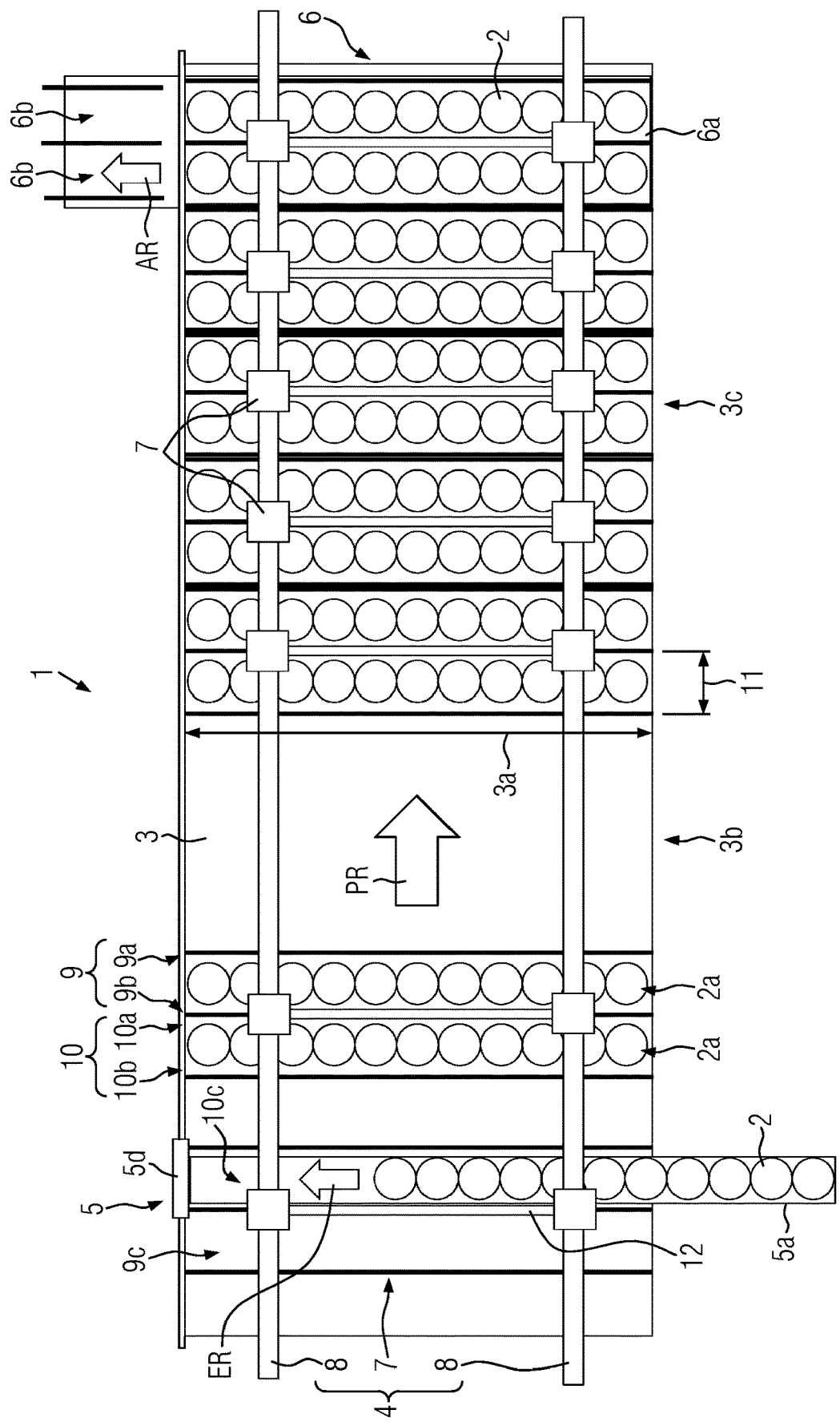
FIG. 1 shows a schematic top view of the device.
Figure 2:
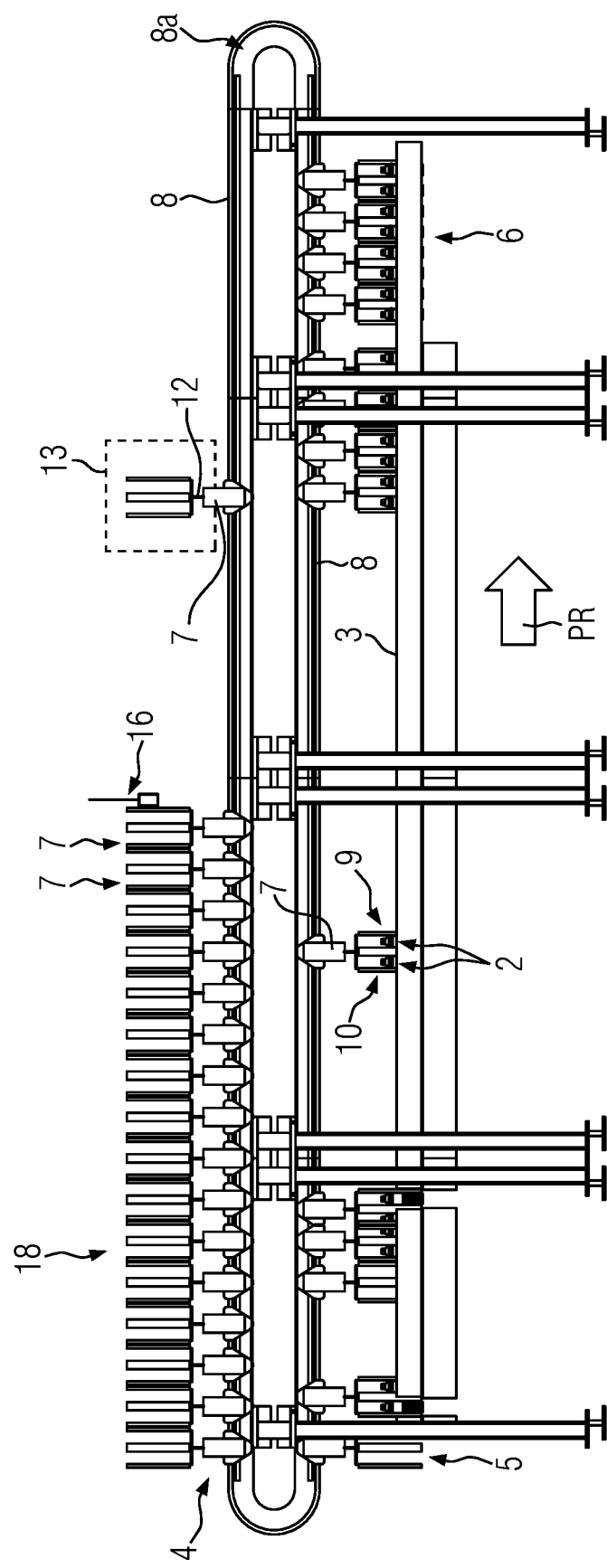
FIG. 2 shows a schematic side view of the device.

As can be seen in FIG. 1 and FIG. 2, device 1 for buffering containers 2/groups of containers 2a grouped in a single row comprises a substantially horizontal and stationary buffer area 3 as well as a transport system 4 arranged thereabove for moving containers 2/groups of containers 2a on buffer area 3 in a buffering direction PR from an infeed region 5 with at least one infeed conveyor belt 5a to an outfeed region 6 with at least one outfeed conveyor belt 6a.

At least one infeed conveyor belt 5a runs in an infeed direction ER and outfeed conveyor belt 6a in an outfeed direction AR each transverse and in particular orthogonal to buffering direction PR of transport system 4.

Transport system 4 comprises independently driven shuttles 7 and rails 8 configured as a closed circulation path on which shuttles 7 run.

Shuttles 7 may comprise at least one row pusher 9 being anterior (viewed in buffering direction PR) and a row pusher 10 being posterior in this regard. Shuttles 7, however, could also each comprise only one of row pushers 9, 10.

Row pushers 9, 10 arranged consecutively in buffering direction PR on shuttle 7 can also be viewed as twin row pushers. Each row pusher 9, 10 is configured to receive containers 2/groups of containers 2a in a single row and is oriented transverse, in particular orthogonal, to buffering direction PR. Row pushers 9, 10 can therefore also be viewed as buffer lines that are movable in buffering direction PR and spatially separated from one another for the individual groups of containers 2a.

Figure 3:
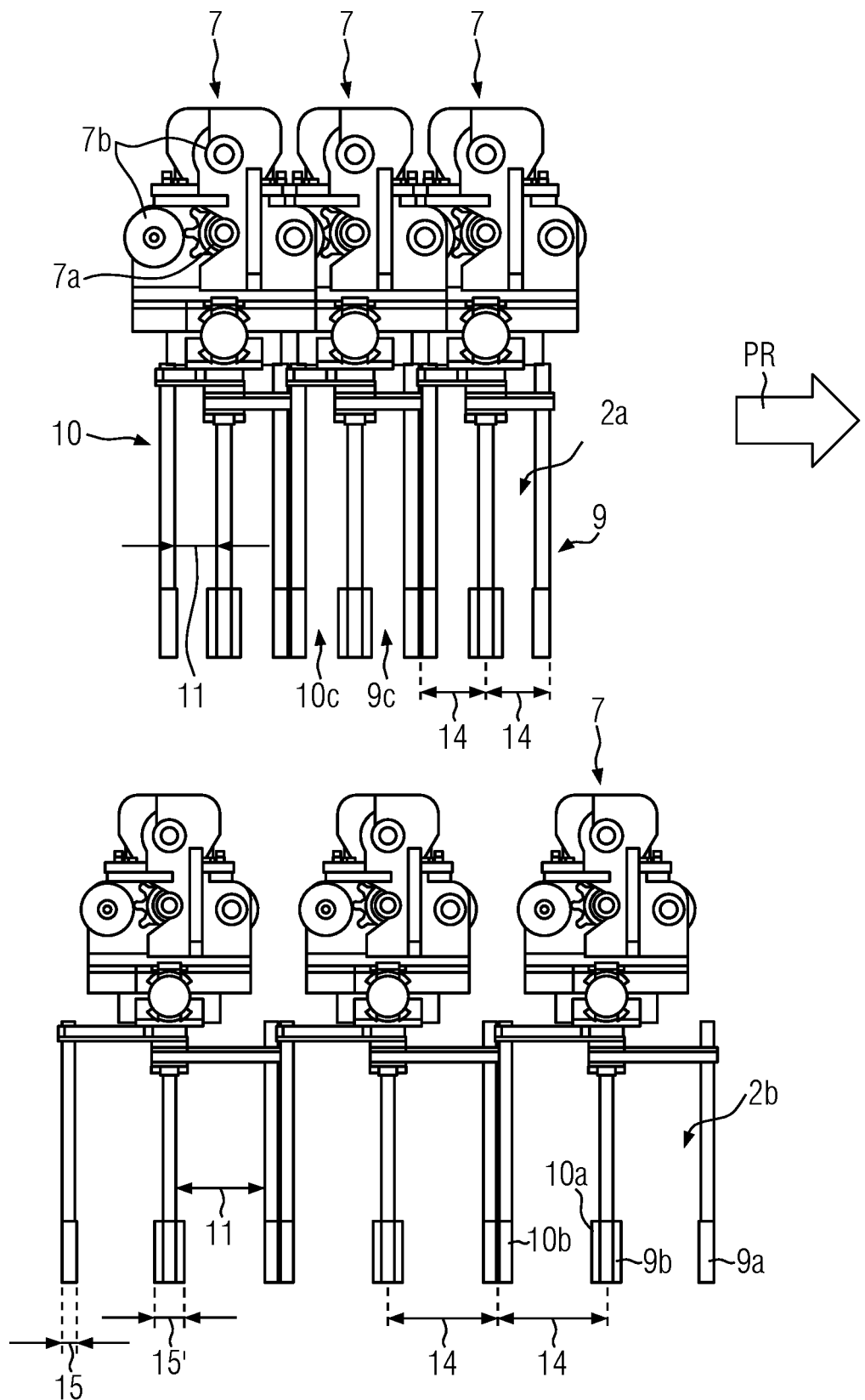
FIG. 3 shows a side view of shuttles with two row pushers.
Figure 4:
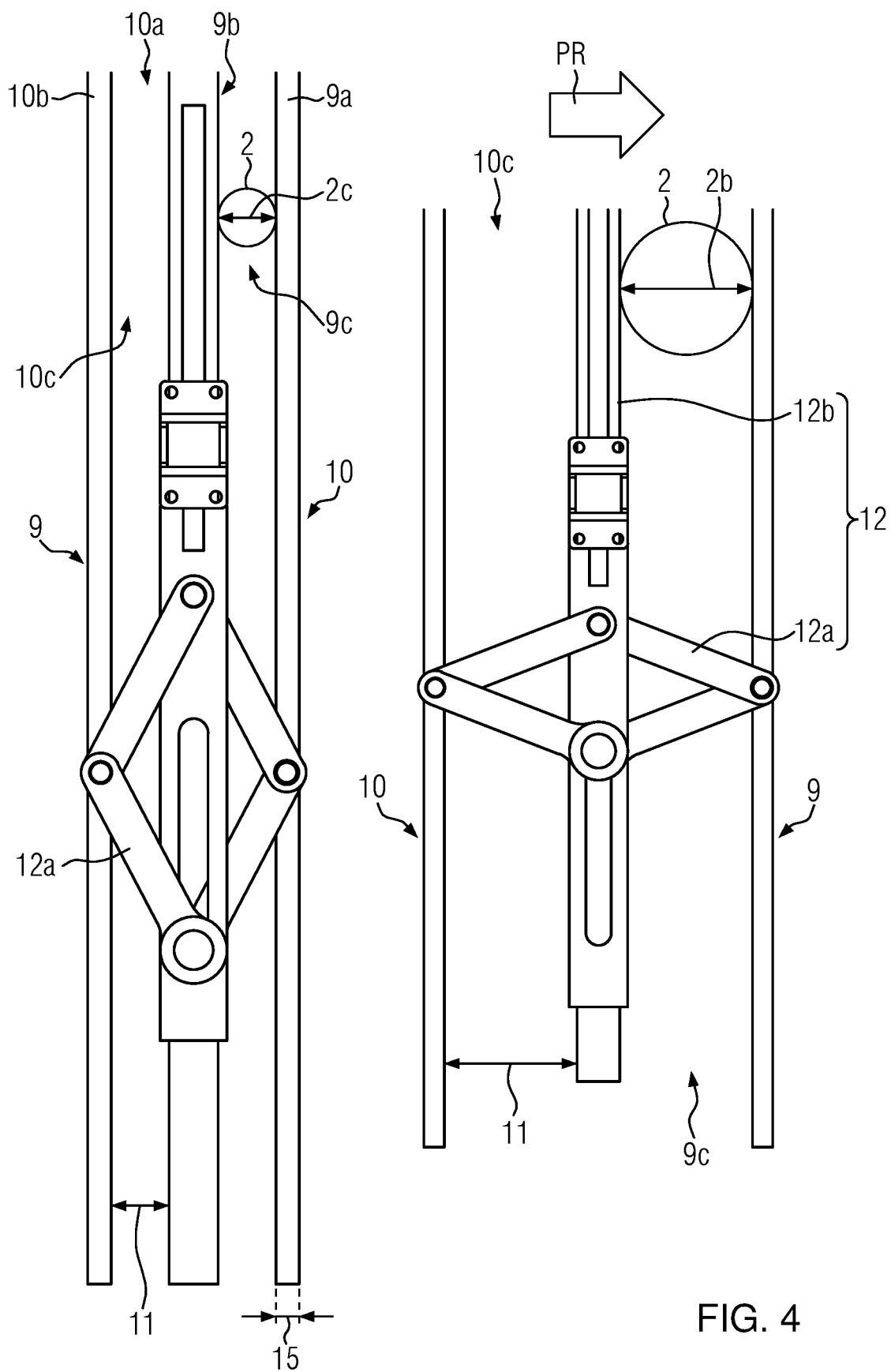
FIG. 4 shows a top view onto an actuating mechanism for adjusting the row pushers.

As can be seen in detail, for example, in FIG. 3 and FIG. 4, row pushers 9, 10 are configured for the respective leading and trailing guidance of containers 2 grouped in a single row and therefore for their guidance both in buffering direction PR, i.e., when they are advanced in buffering direction PR, for example, when accelerating the advancement, as well as opposite to buffering direction PR, in particular when decelerating the advancement.

Containers 2 are, for example, bottles.

Row pushers 9, 10 for this purpose each comprise an anterior row guide 9a, 10a leading containers 2 and a posterior row guide 9b, 10b trailing containers 2, as well as guide channels 9c, 10c defined by the former for receiving and guiding containers 2/individual groups of containers 2a on both sides.

Row pushers 9, 10 or their guide channels 9c, 10c each have a clear width 11 respectively defined between anterior row guide 9a, 10a and posterior row guide 9b, 10b which can be adapted to the respective container width/the respective container diameter, which is shown in FIG. 4 for two different diameters 2b, 2c of containers 2 by way of example.

Shuttles 7 can each comprise an actuating mechanism 12, indicated only schematically in FIG. 2 and illustrated by way of example in FIG. 4, for adjusting clear width 11, in particular jointly for both guide channels 9c, 10c.

Indicated schematically in FIG. 2 is furthermore a stationary adjustment station 13, in the region of which shuttles 7 each temporarily stop for adjusting clear width 11, so that an actuator (not shown) present at adjustment station 13 can appropriately actuate actuating mechanism 12 of respective shuttles 7 by machine in order to adjust clear width 11, for example, in an automated manner and thus adapt it to the format of containers 2 to be buffered.

However, it would also be conceivable that shuttles 7 stop one after the other at adjustment station 13 and clear width 11 is adjusted there manually by way of actuating mechanism 12.

Row pushers 9, 10 may extend substantially over entire width 3a of buffer area 3 and may have a width (transverse to buffering direction PR) of 3 to 6 m, in particular of 4 to 5.5 m.

As FIG. 3 and FIG. 4 illustrate by way of example for a minimum diameter 2a and a maximum diameter 2b of containers 2, shuttles 7 can be driven so close together and then moved synchronously in buffering direction PR that guide channels 9c, 10c of several shuttles 7 move up on buffer area 3 to outfeed region 6 at an even distance of a minimal transport separation 14 from one another.

As can be seen in particular from FIG. 4, respective minimum transport separation 14 is determined substantially by clear width 11 set and thickness 15 (dimension in buffering direction PR) of row guides 9a, 9b, 10a, 10b.

Posterior row guide 9b of anterior row pusher 9 and anterior row guide 10a of posterior row pusher 10 can be firmly connected to one another in the sense of a twin row guide or configured as a joint structure then having twice the thickness 15 as compared to single row guides 9a, 10b.

FIG. 4 shows an example embodiment of actuating mechanism 12 for the simultaneous adjustment of clear width 11 on a shuttle 7 with a twin row pusher consisting of anterior row pusher 9 and posterior row pusher 10 with their guide channels 9c, 10c.

According thereto, actuating mechanism 12 may comprise a scissors mechanism 12a and an actuating rod 12b or the like, which can be moved, for example, linearly in an associated guide (not shown) and/or can be coupled to a spindle drive. To adjust clear width 11, shuttle 7 is positioned in the region of stationary adjustment station 13 in such a manner that actuating rod 12b can be actuated there mechanically or manually in a manner known per se.

As shown by FIG. 4 in this regard, clear width 11 may be adjusted by changing the distance between anterior row guide 9a of anterior guide channel 9c and posterior row guide 10b of posterior guide channel 10c by way of scissors mechanism 12a, while posterior row guide 9b of anterior guide channel 9c and anterior row guide 10a of posterior guide channel 10c can be firmly coupled to one another and/or configured as a combined assembly and then may accommodate the mounting of scissors mechanism 12a and actuating rod 12b.

Individual row guides 9a, 9b, 10a, 10b may have the same thickness 15 (when viewed in buffering direction PR). If row guides 9b, 10a arranged centrally on shuttle 7 are combined, then the resulting central guide accordingly has twice thickness 15'. Furthermore, shuttles 7 can be driven onto one another without gaps, so that minimum transport separation 14 for the containers/groups of containers 2a arises, which is dependent on clear width 11 set, namely from the addition of clear width 11 and twice the value of thickness 15 of individual row guides 9a, 9b, 10a, 10b.

Clear width 11 and therefore also the smallest possible transport separation 14 can be adjusted with actuating mechanism 12 in a simple manner for individual shuttles 7 consecutively at adjustment station 13.

Shuttles 7 may be configured in such a way that they can be driven so close to one another that smallest possible transport separation 14 arises for row pushers 9, 10 of adjacent shuttles 7 adjoining one another substantially without gaps with smallest possible clear width 11.

It is furthermore indicated schematically in FIG. 2 that a cleaning element 16 can be permanently arranged and/or temporarily mounted on at least one of row pushers 9, 10, for example, for blowing onto, spraying onto, squeegeeing off, and/or brushing off buffer area 3, possibly including infeed region 5 and/or the outfeed region 6.

Cleaning element 16 could be, for example, a brush affixed on row pusher 9, 10, a rotating brush roller, a row of nozzles for a cleaning fluid, a squeegee lip, or the like.

Shuttles 7 are each driven independently of one another. For this purpose, shuttles 7 can be driven, for example, by way of a linear motor drive (respectively not shown), so that individual shuttles 7 can be driven at different speeds and independently of one another.

In principle, however, shuttles 7 could also optionally be coupled to different transport chains individually and independently of one another (not shown). Individual transport chains could then run at different speeds and/or be driven either continuously or clocked at specific time sequences.

Individual shuttles 7 can therefore in principle be moved to any points on the circulation path defined by rails 8 and positioned there, and for this purpose they can be accelerated and decelerated independently of one another. Firstly, the distances between individual shuttles 7 can be changed, for example, to traverse empty regions of buffer area 3, secondly, a sequence of several shuttles 7 can be moved at a constant distance from one another, for example, when shuttles 7 move up to a filled region of buffer area 3 toward outfeed region 6.

Shuttles 7 are configured, for example, as runners of linear motors, the active components of which may be arranged on rails 8 and are then equipped, for example, with associated permanent magnets. With long stators, they form individual drives for individual shuttles 7, as is known.

According to FIG. 3, however, other drives are also conceivable, for example, servomotors (not shown) formed on shuttles 7 with drive pinions 7a which can run along a toothed ring (not shown) formed along rails 8. Shuttles 7 then further comprise guide rollers 7b which interact with rails 8.

For this purpose, drive energy can be transmitted to the servomotors or similar drives of shuttles 7, for example, in a contactless manner, i.e., without conductor lines.

Shuttles 7 can also have energy stores for their individual drives, such as power capacitors, batteries or the like. In this way, peaks in the power consumption can be compensated for, for example, when accelerating shuttles 7, or an energy supply can be maintained in sections of rails 8 in which no permanent energy feed from a stationary energy source is possible.

To control individual shuttles 7, for example, data transmission is possible by way of leakage waveguides and/or in a radio-supported manner, for example, by way of wireless LAN.

Such drive concepts and control concepts are basically known and are therefore not explained in further detail.

Figure 5:
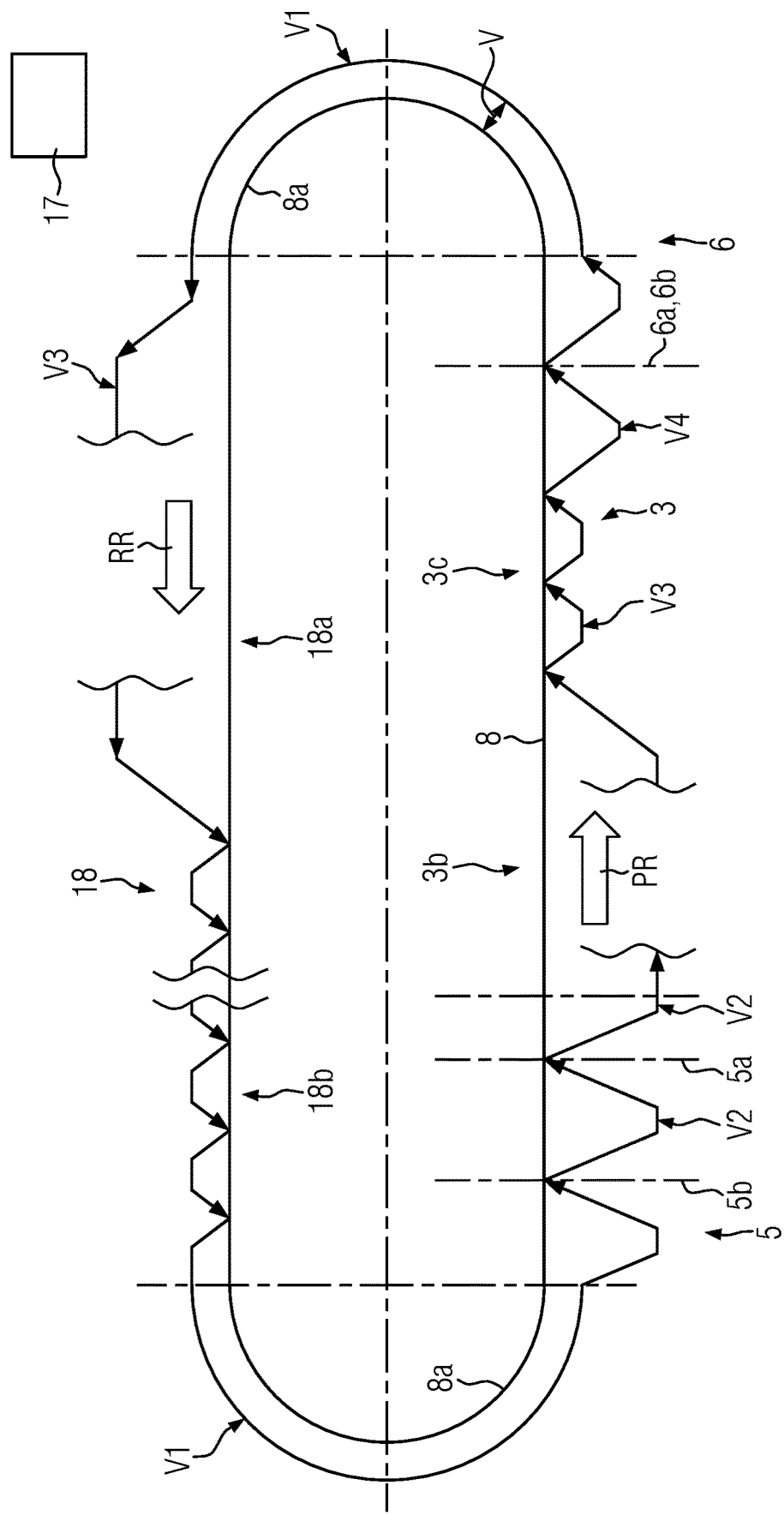
FIG. 5 shows advantageous speed profiles of the shuttles as they circulate on the transport system.

FIG. 5 illustrates example schematic speed profiles of shuttles 7 while circulating on rails 8. Advance speed V of shuttles 7 is shown schematically as an orthogonal curve distance from the respective direction of motion of shuttles 7 along rails 8.

For respective drive control, device 1 can comprise a central control unit 17 for individual shuttles 7. Decentralized control concepts would also be conceivable for this.

Accordingly, waiting empty shuttles 7 move up to infeed region 5, for example, at a first speed V1, where they are accelerated to a speed V2 and decelerated such that they initially come to a standstill above a posterior infeed conveyor belt 5b (as viewed in buffering direction PR). Respective anterior row pushers 9 are there populated with containers 2 in a single row, as shown, for example, in FIG. 6A to FIG. 6E.

For the subsequent approach to an infeed conveyor belt 5a being anterior (as viewed in buffering direction PR), shuttles 7 are again accelerated to second speed V2 and then decelerated again to a standstill. Posterior row pushers 10 are equipped with containers 2 in a single row by anterior infeed conveyor belt 5a, as is also shown in FIG. 6A to FIG. 6E.

Second speed V2 may be greater than first speed V1, as a result of which the entry into storage is accelerated and, if necessary, can be adapted to the conveying speed of the arriving container flow.

Two-sided row pushers 9, 10, namely leading and trailing ones, there ensure that containers 2/groups of containers 2a received by the former can be carried along in buffering direction PR and positioned precisely and largely secured against falling over both when accelerating and when decelerating shuttles 7.

When subsequently traversing an empty buffer region 3b of buffer area 3, shuttles 7 may be accelerated again to second speed V2 and are driven at this speed up to a buffer region 3c of buffer area 3 occupied by shuttles 7 and decelerated for adjoining shuttles 7 already positioned.

In occupied buffer region 3c, shuttles 7 advance at a third speed V3 toward outfeed region 6, in particular in step-by-step manner, while maintaining transport separation 14 of containers 2/groups of containers 2a.

Third speed V3 in occupied buffer region 3c can be lower than first speed V1 in infeed region 5 and second speed V2 in empty buffer region 3b.

In order to be removed from storage, shuttles 7 are accelerated, for example, to a fourth speed V4 and then decelerated to a standstill above associated outfeed conveyor belt 6a. Outfeed conveyor belt 6a may be there at a standstill.

As a result, row pushers 9, 10 can be positioned in alignment with respectively associated transport aisles 6b. For example, containers 2/groups of containers 2a can exit selectively transverse to buffering direction PR from guide channels 9c, 10c of row pushers 9, 10 by a start-stop control of at least one outfeed conveyor belt 6a and then be associated with individual transport aisles 6b arranged adjacently. A separately controllable/driven outfeed conveyor belt 6a may be associated with each transport aisle 6b.

Fourth speed V4 in outfeed region 6 can be, for example, greater than third speed V3 and less than second speed V2.

Emptied shuttles 7 can be driven, for example, at fourth speed V4 up to the end of outfeed region 6 and decelerated there to first speed V1 in order to finally drive the shuttles along a curved segment 8a of rails 8, may be configured as a clothoid, upwardly into an empty shuttle buffer 18 for waiting empty shuttles 7.

Shuttles 7 pass through empty shuttle buffer 18 in a return direction RR that is opposite to buffering direction PR and may be in an upside-down manner with regard to their alignment on buffer region 3.

Empty shuttle buffer 18 generally comprises a receptive buffer region 18a, i.e., one that is not occupied with empty shuttles 7, and a buffer region 18b occupied with empty shuttles 7. Unoccupied buffer region 18a can be traversed, for example, at second speed V2. To move up in occupied buffer region 18b, empty shuttles 7 can again be accelerated step-by-step to third speed V3 and decelerated to a standstill.

Leading and trailing row pushers 9, 10 enable comparatively high speeds of populated shuttles 7 with exact positioning of containers 2/groups of containers 2a in and opposite to buffering direction PR in guide channels 9c, 10c while avoiding individual containers 2/groups of containers 2a from falling over, both when accelerating and decelerating shuttles 7.

In addition, guide channels 9c, 10c facilitate the precise entry into and removal from storage transverse to buffering direction PR, for example, on at least one outfeed conveyor belt 6a when distributing containers 2/groups of containers 2a to different transport aisles 6b.

An example sequence of the method when entering containers 2 grouped in a single row into storage in device 1 is indicated by way of example in FIG. 6A, FIG. 6B, FIG. 6C, FIG. 6D, and FIG. 6E with the aid of five shuttles 7.1, 7.2, 7.3, 7.4, and 7.5 and two infeed conveyor belts 5a, 5b arranged consecutively in buffering direction PR. A gap/intermediate position 5c for parking individual shuttles 7 is preferably present between infeed conveyor belts 5a, 5b.

According thereto, shuttles 7.1, 7.2, 7.3, 7.4, and 7.5 move with their anterior row pushers 9.1, 9.2, 9.3, 9.4, and 9.5 and their posterior row pushers 10.1, 10.2, 10.3, 10.4, and 10.5 step by step in buffering direction PR first over respective posterior infeed conveyor belt 5b and then over respective anterior infeed conveyor belt 5a.

Figure 6A:
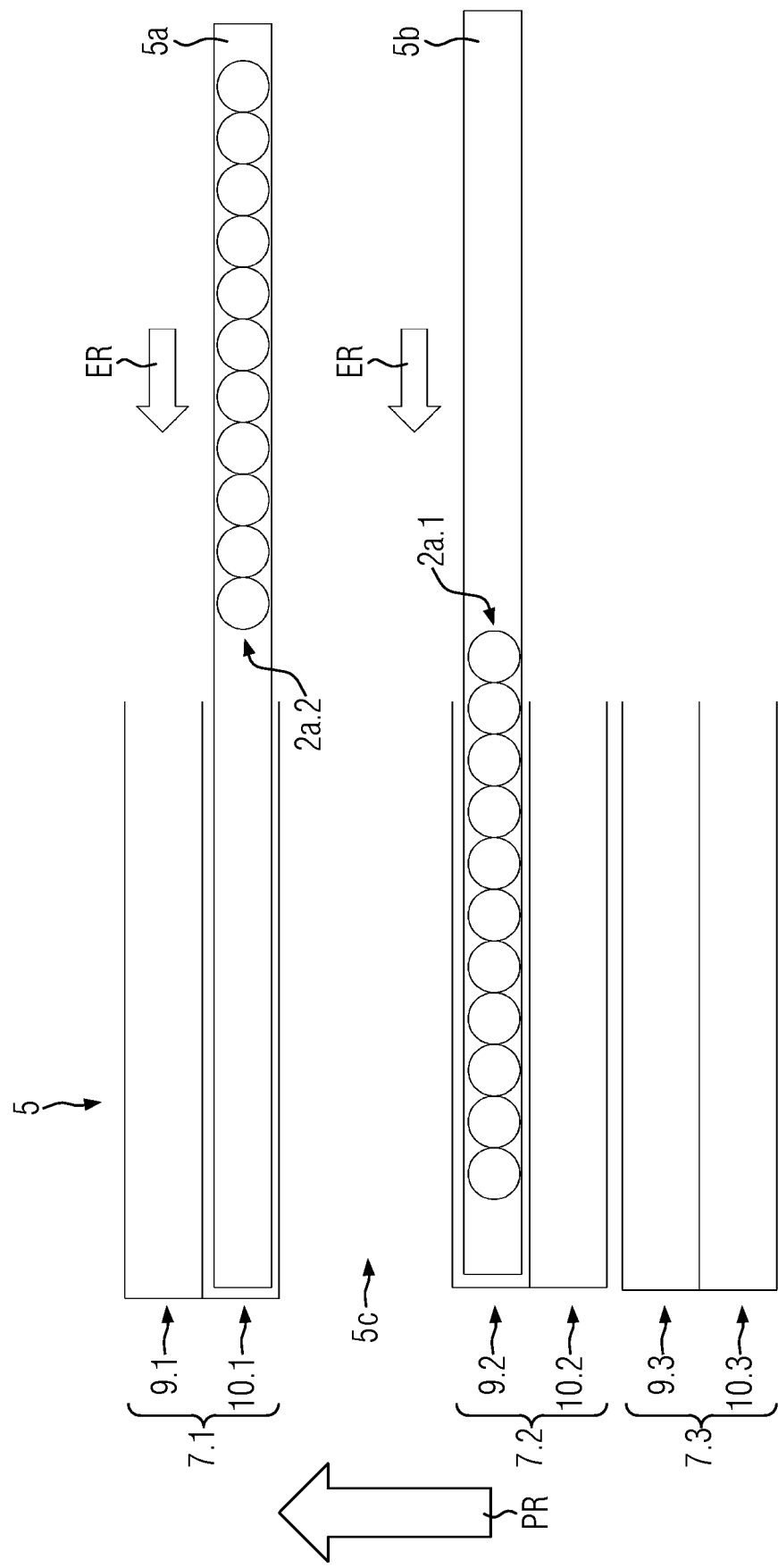

According to FIG. 6A, posterior row pusher 10.1 of a foremost first shuttle 7.1 is positioned to be stationary above anterior infeed conveyor belt 5a at the beginning of the sequence shown. Furthermore, anterior row pusher 9.2 of a subsequent second shuttle 7.2 is simultaneously positioned to be stationary above posterior infeed conveyor belt 5b.

In this arrangement, a single-row first container group 2a.1 on posterior infeed conveyor belt 5b first arrives transverse to buffering direction PR, and a second container group 2a.2, which follows temporally without a gap in the product flow, on anterior infeed conveyor belt 5a.

Also shown in FIG. 6A is a subsequent third shuttle 7.3 with its row pushers 9.3 and 10.3 not yet populated.

Figure 6B:
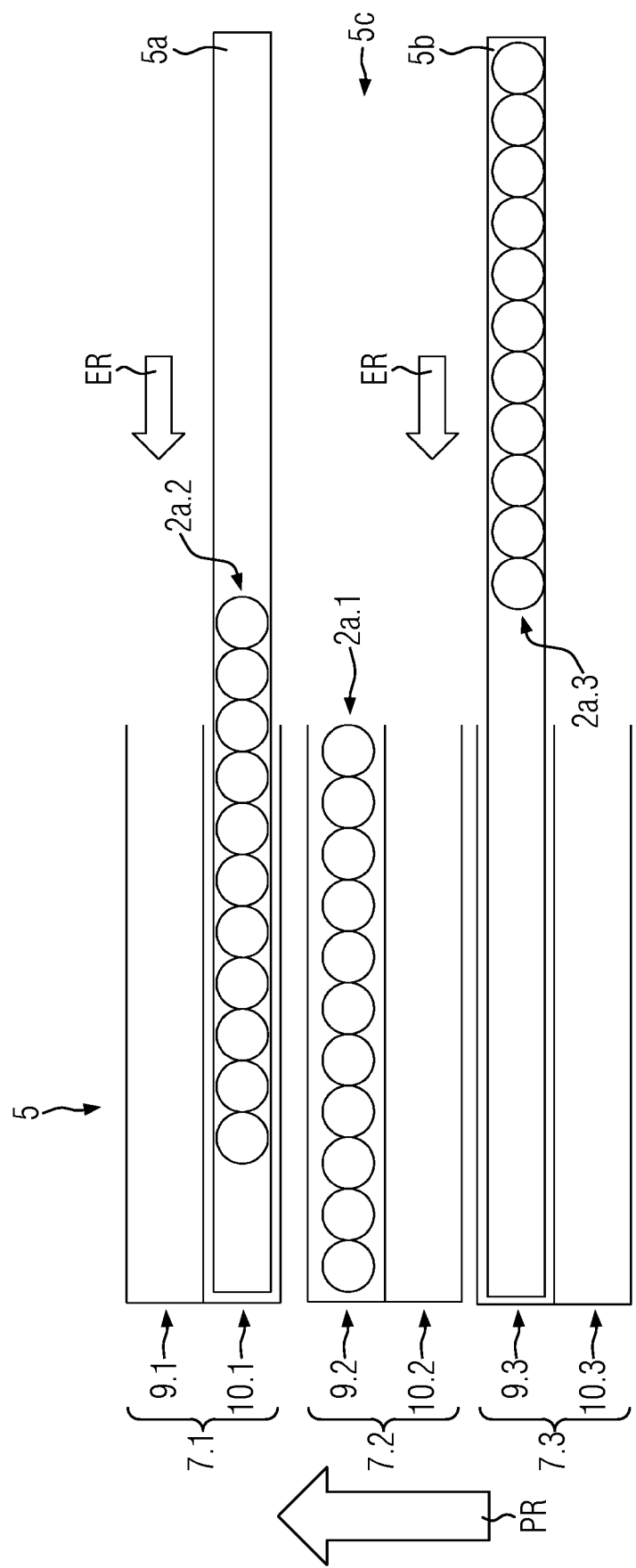

FIG. 6B shows a subsequent snapshot of the entry into storage after first container group 2a.1 has been completely received by anterior row pusher 9.2 of second shuttle 7.2 and the latter was driven with both row pushers 9.2, 10.2 in the gap/to intermediate position 5c between anterior and posterior infeed conveyor belt 5a, 5b. Second shuttle 7.2 waits there temporarily pending its posterior row pusher 10.2 subsequently being populated on anterior infeed conveyor belt 5a.

In contrast, first shuttle 7.1 with its posterior row pusher 10.1 is still positioned unchanged above anterior infeed conveyor belt 5a.

At the point in time shown in FIG. 6B, second container group 2a.2 has almost completely entered posterior row pusher 10.1 of first shuttle 7.1.

In addition, third shuttle 7.3 has meanwhile reached the position previously assumed by second shuttle 7.2, so that anterior row pusher 9.3 of third shuttle 7.3 is now positioned in a stationary manner above posterior infeed conveyor belt 5b. Correspondingly, a third container group 2a.3 temporally immediately following second container group 2a.2 can enter there in infeed direction ER, i.e., transverse to buffering direction PR.

FIG. 6C shows a subsequent point in time of entry into storage at which first shuttle 7.1 has left infeed region 5 and, in its place, second shuttle 7.2 has positioned its posterior and still empty row pusher 10.2 above anterior infeed conveyor belt 5a. Second shuttle 7.2 there moves anterior row pusher 9.2, which has already been filled with first container group 2a.1, above anterior infeed conveyor belt 5a.

A fourth container group 2a.4 following without gaps can therefore subsequently enter posterior row pusher 10.2 of second shuttle 7.2.

It can further be seen in FIG. 6C that when containers 2 are entered into storage for the first time, i.e., on first shuttle 7.1 illustrated, anterior row pusher 9.1 remains empty.

At the point in time shown in FIG. 6C, third container group 2a.3 has furthermore almost completely entered anterior row pusher 9.3 of third shuttle 7.3, so that the latter, after third container group 2a.3 has fully entered, can be driven to intermediate position 5c between anterior infeed conveyor belt 5a and posterior infeed conveyor belt 5b in order to wait there for further population with containers 2.

Figure 6D:
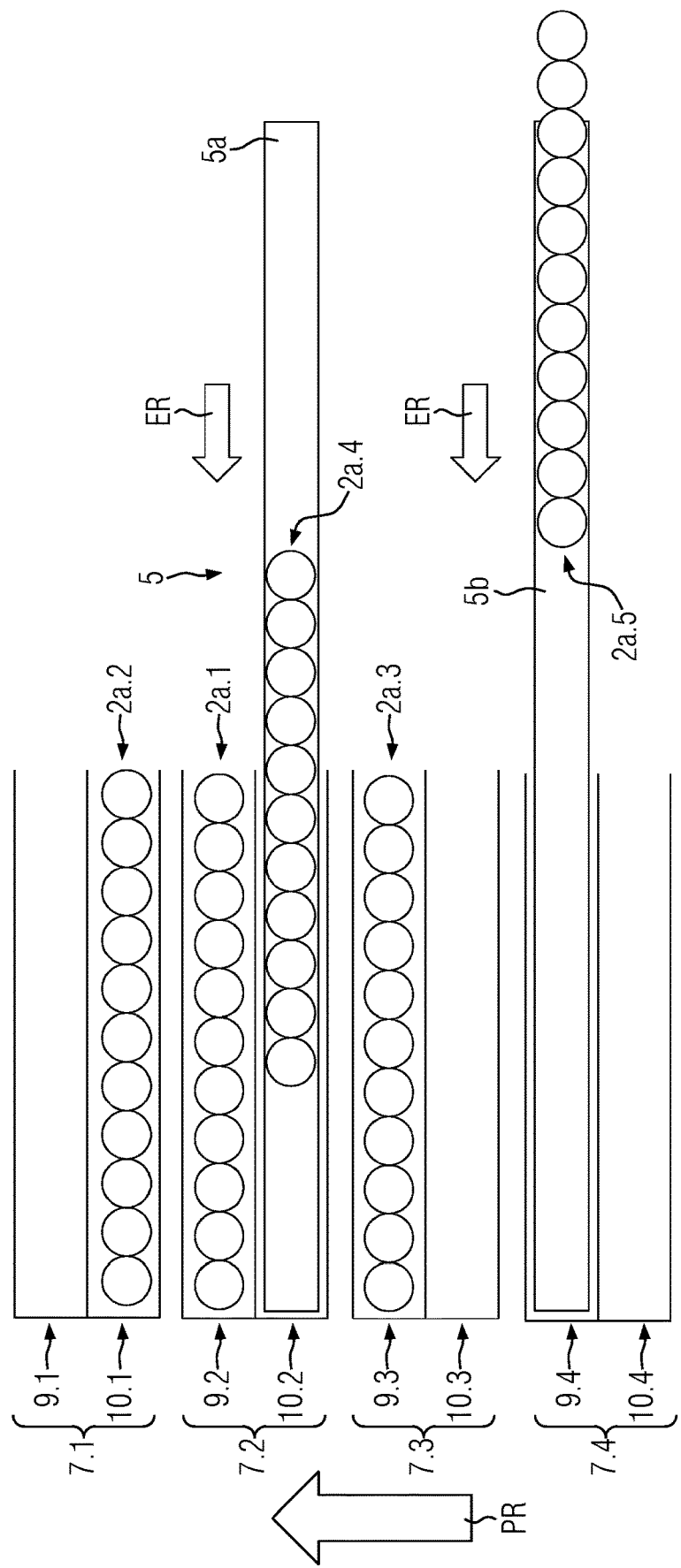

This state is shown in FIG. 6D while fourth container group 2a.4 is entering posterior row pusher 10.2 of second shuttle 7.2 which is positioned above anterior infeed conveyor belt 5a.

A fifth container group 2a.5 entering on posterior infeed conveyor belt 5b temporally immediately following fourth container group 2a.4 can also be seen in FIG. 6D.

Figure 6E:
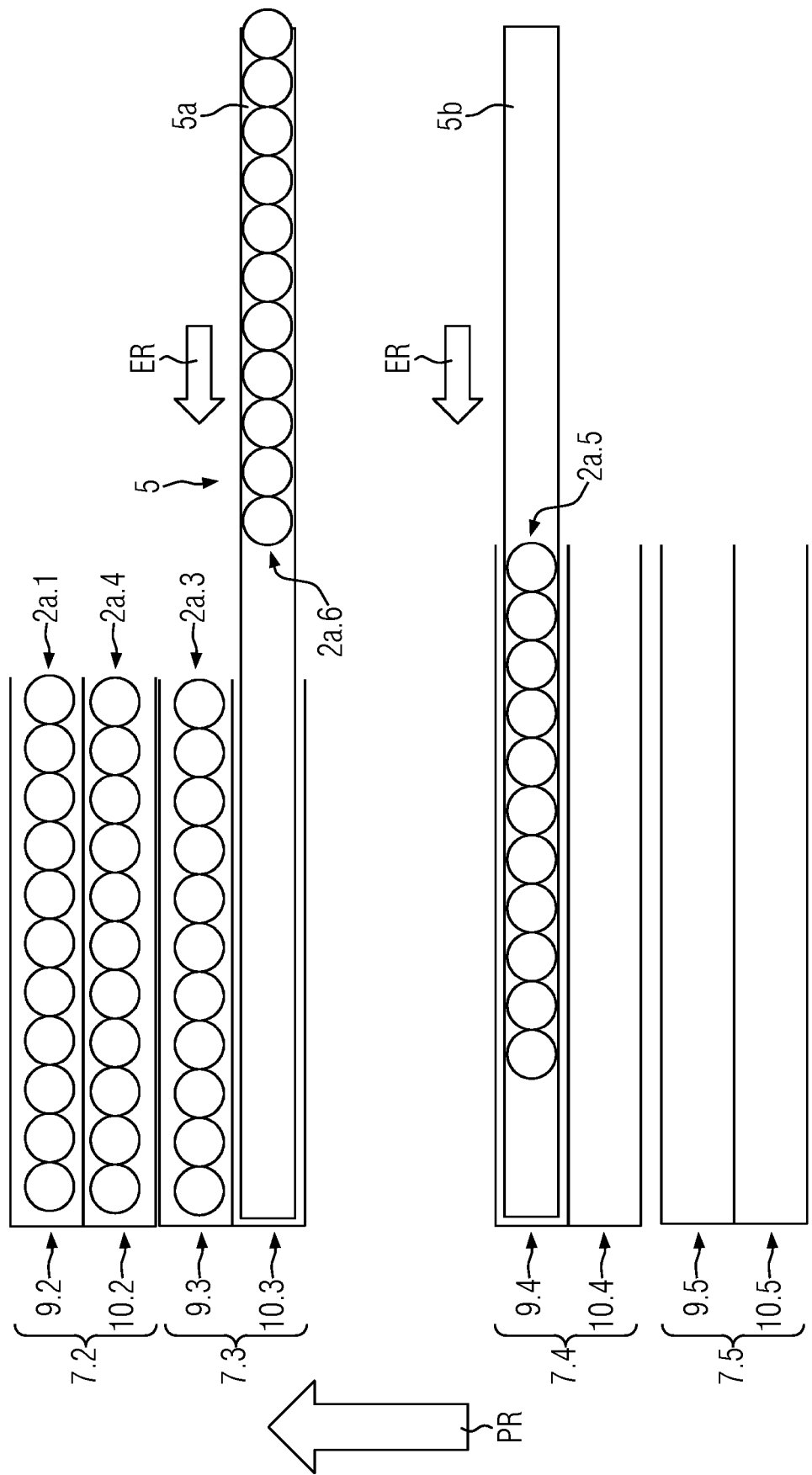

FIG. 6E shows a point in time after first shuttle 7.1 with its populated posterior row pusher 10.1 and unpopulated anterior row pusher 9.1 has moved in buffering direction PR out of the region shown. Accordingly, second shuttle 7.2 with groups of containers 2a.1 and 2a.4 received by the former is meanwhile located in the foremost position shown.

Meanwhile, fifth container group 2a.5 enters into anterior row pusher 9.4 of fourth shuttle 7.4. Immediately thereafter, a sixth container group 2a.6 enters on anterior infeed conveyor belt 5a, where third shuttle 7.3 was meanwhile moved out of intermediate position 5c to the region of anterior infeed conveyor belt 5a, so that posterior row pusher 10.3 of third shuttle 7.3 is now located there.

A fifth shuttle 7.5 with associated row pushers 9.5, 10.5, which moves up to posterior infeed conveyor belt 5b, is furthermore shown for the sake of completeness.

The sequence illustrated in FIG. 6C, FIG. 6D, and FIG. 6E is then repeated for all shuttles 7 respectively moving up into infeed region 5 when containers 2/groups of containers 2a are entered into storage in a single row in respective anterior or posterior row pushers 9, 10.

This enables containers 2/groups of containers 2a entering in a single row to be entered into storage in a temporally gap-less and space-saving manner for their respective single-row buffering in buffering direction PR, i.e., without back pressure.

A stop 5d can be formed at the end of infeed conveyor belts 5a, 5b for containers 2/groups of containers 2a so that they enter row pushers 9, 10 without gaps up to the face side end of guide channels 9c, 10c and strike there. This is indicated schematically in FIG. 6D and shown in FIG. 1 for a single infeed conveyor belt 5a.

Instead, row pushers 9, 10 could have corresponding stops (not shown) at their face side ends, which, for example, could be folded up in an automated manner for removal from storage.

In addition, a stop at the face side of containers 2 can be dispensed with if infeed conveyor belt 5a, 5b is stopped in a selective manner when container group 2a has completely entered respective row pusher 9, 10.

With device 1 described and the method described, the following advantages can be obtained:

Containers 2 can be entered into storage without pressure, moved in a single row grouping on buffer area 3, and also again be removed from storage in this manner.

A connection of groups of containers 2a to one another in a manner temporally without gaps can there be maintained both for entry into storage as well as removal from storage. This is also possible in a flexible manner with different container formats, for example, with container diameters of 40 to 150 mm.

For example, depending on the mass of individual containers 2, the length of groups of containers 2a per row pusher 9, 10 can be flexibly adapted to the performance of shuttles 7 with regard to the maximum permissible mass inertia for optimal utilization of device 1. For example, single-row groups of containers 2a having a length of 4 to 5.5 meters are particularly advantageous for efficient buffering of containers 2/groups of containers 2a (at most corresponding to the width of row pushers 9, 10).

Containers/groups of containers 2a are preferably transported to device 1 as a gapless flow of containers. This is possible in a manner known per se by interlinking several conveyor belts driven independently of one another at variable speeds and interposed transfers (not shown).

Device 1 can comprise a track switch 19 (shown schematically in a different context in FIG. 7) upstream of infeed region 5 for distributing the container flow entering in a gapless manner to groups of containers 2a, in particular to distribute them in a gapless succession to infeed conveyor belts 5a, 5b.

In addition, individual infeed conveyor belts 5a, 5b could be driven independently of one another in such a manner that the temporal sequence of containers 2/groups of containers 2a entering on individual infeed conveyor belts 5a, 5b can be synchronized with the advancement of shuttles 7 in infeed region 5 or otherwise corrected.

In principle, an alternative embodiment of device 1/the method with regard to the entry into storage would also be conceivable, where several row pushers 9, 10 could be populated with containers 2/groups of containers 2a simultaneously or at least in a temporally overlapping manner. This is indicated by way of example and schematically in FIG. 7.

According thereto, transport paths 20, 21 connected in parallel between track switch 19 and infeed region 5 could be of different lengths and/or operated at different transport speeds, so that groups of containers 2a continuously distributed alternately on transport paths 20, 21 at track switch 19 are underway for such different lengths of time between track switch 19 and infeed region 5 that they finally arrive there at the same time and enter into waiting row pushers 9, 10.

This means that container group 2a first separated from the continuous and gapless container flow then passes through shorter transport path 20, and a container group 2a separated immediately afterwards from the container flow then passes through correspondingly longer transport path 21.

In principle, this would also be possible with a larger number of transport paths 20, 21, for example, with four transport paths of different lengths (not shown), which are then likewise configured in such a way that groups of containers 2a separated consecutively from the incoming container flow simultaneously enter infeed region 5 and row pushers 9, 10 waiting there.

Another advantage of device 1 is that buffer area 3 and associated transport system 4 can be structured in a modular manner and the buffer capacity can also be subsequently adjusted, for example, by being increased or decreased in buffering direction PR.

In addition, device 1 described and the method described make it possible to buffer containers 2 grouped in a single row at comparatively high machine outputs of, for example, 60,000 containers 2 per hour. In continuous system operation, the buffer capacity is then, for example, at up to one minute.

In outfeed region 6, at least one outfeed belt 6a is driven intermittently for distributing individual containers 2/groups of containers 2a in a selective manner to specific transport aisles 6b. The entry into individual transport aisles 6b can also be blocked in a selective manner in order to prevent containers 2/groups of containers 2a from being removed from storage in certain transport aisles 6b in an undesired manner. Such processes could be, for example, synchronized with the drive of shuttles 7 by control unit 17. In principle, this also applies to the entry into storage at at least one infeed conveyor belt 5a, 5b.

Individually controllable conveyor belts can be connected to at least one outfeed conveyor belt 6a in order to create the desired temporal processes of containers 2/groups of containers 2a removed from storage for their subsequent processing, for example, in a subsequent packaging machine. The synchronization of different conveyor belts and their adaptation with regard to the transport speed is known per se and is therefore not explained in detail in this context.

Outfeed region 6 can be configured, for example, such that containers 2/groups of containers 2a run out of several row pushers 9, 10 consecutively and/or in parallel and are there distributed over, for example, three to twelve adjacently disposed transport aisles 6b.

Device 1 was shown in a so-called Z-arrangement, i.e., with opposite orthogonal changes of direction from infeed direction ER to buffering direction PR and from there to outfeed direction AR, so that infeed direction ER of containers 2/groups of containers 2a in infeed region 5 and outfeed direction AR of containers 2/groups of containers 2a in outfeed region 6 are identical.

Figure 7:
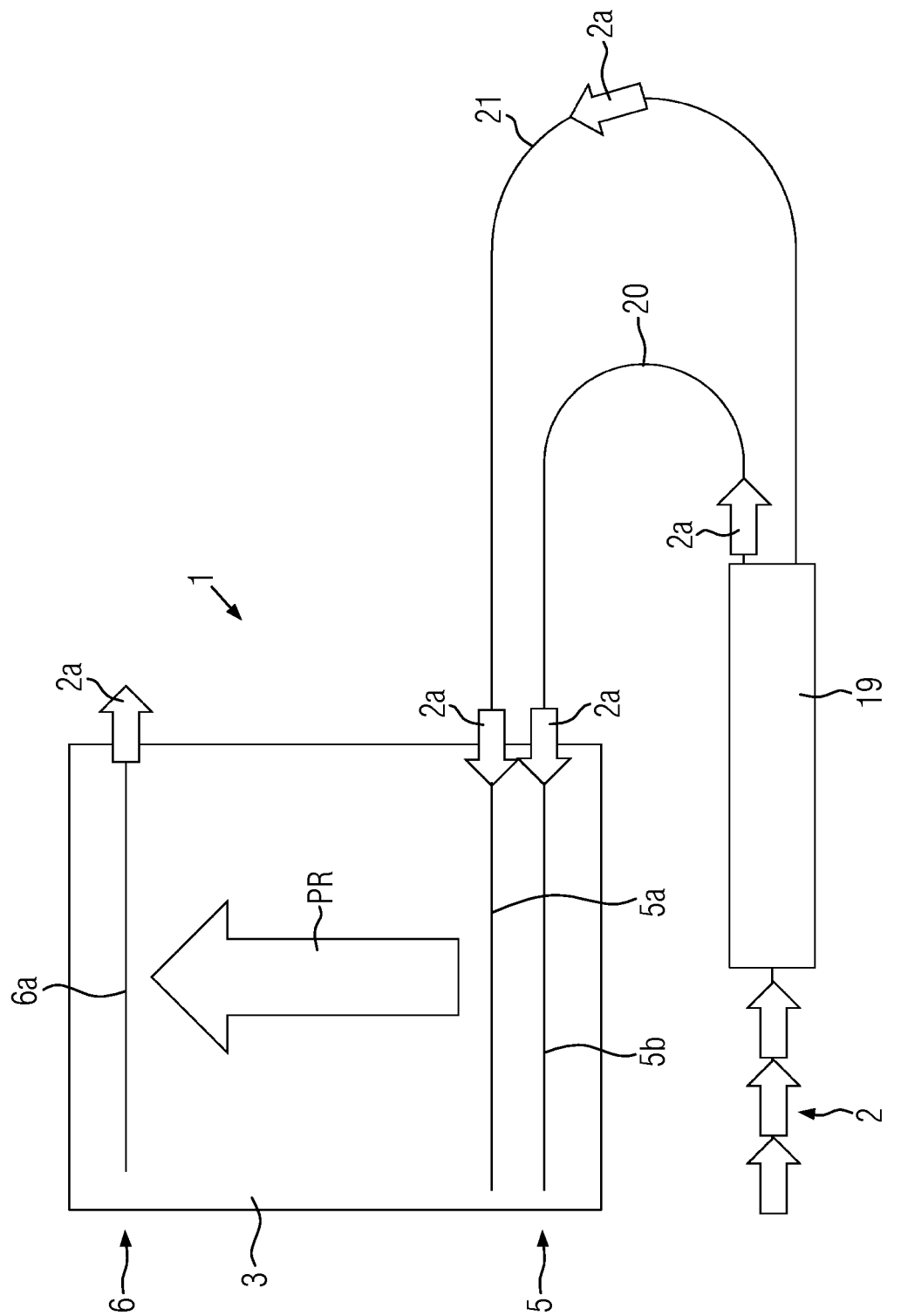
FIG. 7 shows a schematic representation of an alternative container infeed.

However, a so-called U-arrangement is also conceivable, i.e., with orthogonal changes of direction in the same direction in and out of buffering direction PR, so that infeed direction ER of containers 2/groups of containers 2a in infeed region 5 and outfeed direction AR of container 2/groups of containers 2a in outfeed region 6 are opposite to each other. This is indicated in FIG. 7 merely by way of example.

For this purpose, substantially only the direction of travel of the at least one outfeed conveyor belt 6a would have to be reversed and downstream devices for distributing containers 2/groups of containers 2a to transport aisles 6b, for example, discharge barriers to individual transport aisles 6b, would have to be arranged accordingly.

Figure 8:
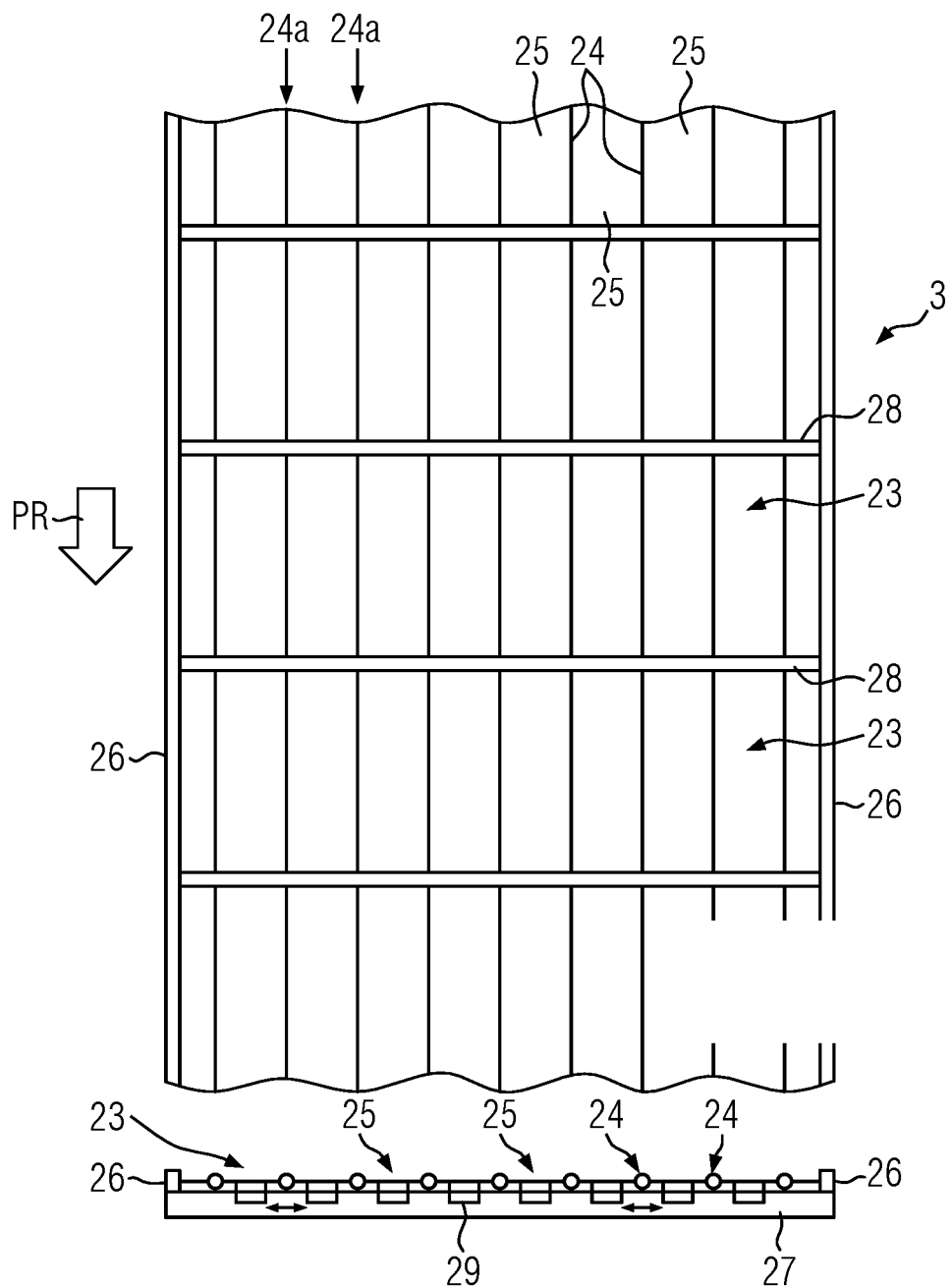
FIG. 8 shows a schematic representation of a preferred buffer area.

FIG. 8 shows schematically in a top view and in cross-section a preferred embodiment of buffer area 3. According thereto, the latter can be formed by mat chains 23 or comprise such. Mat chains 23 each comprise chain links that are strung together at joints 24 transverse to buffering direction PR. This means that joint axes 24a of individual joints 24 are substantially aligned in buffering direction PR.

Mat chains 23 serve as a stationary sliding surface and in normal buffer operation are therefore not driven to move containers 2 in buffering direction PR.

In addition, mat chains 23 could have sections driven transverse to buffering direction PR for moving containers 2 on buffer area 3 within row pushers 9, 10 transverse to buffering direction PR, for example, in order to close gaps between containers 2.

Chain links 25 of mat chains 23 are preferably made of plastic material. This enables low coefficients of friction with most common containers 2.

Joints 24 can be formed to be elevated relative to the remainder of chain body of mat chains 23.

The alignment of mat chains 23 transverse to buffering direction PR provides the advantage that containers 2 are then not moved over joints 24, but are moved along joints 24. This avoids unwanted swinging of container 2 when moved and a so-called stick-slip effect.

Mat chains 23 on their adjacent longitudinal sides and at their outer ends on the lateral edge of buffer area 3 are attached to strips 26 or the like. Mat chains 23 can lie loosely on an underframe 27, which is common with conventional transporters.

The length of individual mat chains 23 (transverse to buffering direction PR) preferably corresponds to width 3a of buffer area 3. This enables the pre-installation of mat chains 23 in the sense of a modularly structured buffer area 3.

Guide strips 28, which are oriented transverse to buffering direction PR and which absorb shear forces transmitted to mat chains 23 in buffering direction PR, are preferably formed between mat chains 23. Guide strips 28 then preferably likewise run over entire width 3a of buffer area 3. Guide strips 28 are preferably made of plastic material.

Mat chains 23 can comprise downwardly pointing webs 29 or similar projections for anchoring purposes in buffering direction PR on underframe 27 in order to divert shear forces from chain links 25 to underframe 27. Webs 29 can then move transverse to buffering direction PR with respect to the underframe.

Mat chains 23 are preferably only attached at their outer ends, i.e., at the edge of buffer area 3, and are not tensioned in the process. Chain links 25 can therefore during the buffering operation compensate for changes in length, for example, due to temperature fluctuations. This is a major advantage of mat chains 23 over a buffer area 3 made of plates.

Suitable mat chains 23 are available with different surface structures and can be selectively adapted to containers 2 in the sense of a friction surface pairing. This means that mat chains 23 can be selectively configured for types of containers 2 that are likely to be buffered.

FIG. 9 in a schematic side view of device 1 shows that the latter can comprise at least one integrated treatment unit 31 in the region of buffer area 3. Treatment unit 31 can be, for example, a cooling tunnel for subsequent digital direct printing onto containers 2.

Containers 2 can also be arranged at a distance from one another (transverse to buffering direction PR) in respective row pusher 9, 10 and thus be pushed through treatment unit 31. Row pushers 9, 10 can possibly touch and push containers 2 at predetermined wall sections that remain the same during the treatment.

Entry into storage and removal therefrom and as well as a transfer of containers 2 therebetween over a process section of treatment unit 31 and dynamic buffering of containers 2 are possible with device 1.

The transfer of containers 2 to subsequent treatment units downstream of device 1 is then possible in batches. This means that the process times for containers 2/groups of containers 2a can be adapted in batches in device 1. This is made possible by the mutually independently controlled drive of shuttles 7, so that containers 2 can be moved in batches faster or slower through treatment unit 31 as required. A combination of a dynamic buffer and at least one treatment unit 31 in device 1 makes it possible to react immediately to changes in the productivity of a higher-level container treatment system/filling system.

Device 1 described can be housed in a space-saving manner and/or equipped with monitoring systems known per se for monitoring the integrity of groups of containers 2a that have entered row pushers 9, 10. For example, the completeness and/or position of groups of containers 2a in row pushers 9, 10 could be monitored. For this purpose, weighing devices could be integrated into buffer area 3. Groups of containers 2a could also be visually monitored when entered into storage and/or removed therefrom.

When device 1 is housed, adjustment station 13 can be arranged such that it can be operated from outside the housing (not shown) in order to enable, for example, safe manual adjustment of clear width 11.

Furthermore, control unit 17 can be configured such that shuttles 7 move to defined positions in the event of an emergency stop, before access to the interior of the housing is released to personnel.

The invention claimed is:

1. A method for buffering containers grouped in a single row in a filling system, where said containers are entered into storage on at least a first infeed conveyor belt and a second infeed conveyor belt in an infeed direction onto a first end region of a transversely adjoining buffer area, where said containers are moved in the single row on the buffer area by rail-guided and individually driven shuttles with row pushers in a buffering direction running transverse to said infeed direction, where said containers are removed from storage in a second end region of the buffer area, opposite to the first end region, on at least one outfeed conveyor belt adjoining transversely in said buffering direction without changing the same, said row pushers each receive said containers in the single row in a guide channel formed by an anterior row guide leading in the buffering direction and a trailing posterior row guide, and where said containers are separated into single-row groups of containers and are guided alternately on said first infeed conveyor belt and second infeed conveyor belt which are arranged consecutively in said buffering direction.

2. The method according to claim 1, where a clear width between said anterior and posterior row guide is each adapted to a width/a diameter of said containers.

3. The method according to claim 2, where the width/the diameter of said containers is in a range from 40 mm to 150 mm.

4. The method according to claim 1, where said shuttles each position said row pushers in a single row above an associated infeed conveyor belt for receiving said containers and said containers enter said guide channel between said anterior and posterior row guide in a manner standing on said infeed conveyor belt.

5. The method according to claim 1, where said row pushers at said shuttles are moved in pairs.

6. The method according to claim 4, where said row pushers being anterior ones of pairs, when seen in the buffering direction, are each fixedly associated with said first infeed conveyor belt, and said row pushers being posterior ones of the pairs are each fixedly associated with said second infeed conveyor belt arranged anterior of the first infeed conveyor belt, when seen in the buffering direction.

7. The method according to claim 5, where said row pushers being the anterior ones of the pairs, when seen in the buffering direction, are each fixedly associated with said first infeed conveyor belt, and said row pushers being the posterior ones of the pairs are each fixedly associated with said second infeed conveyor belt arranged anterior of the first infeed conveyor belt, when seen in the buffering direction.

8. The method according to claim 1, where said shuttles reach a speed of at least 0.4 m/s when approaching said infeed conveyor belts and/or when traversing unoccupied buffer regions of said buffer area.

9. The method according to claim 1, where said containers are distributed in a single row to 3 to 12 transport aisles when removed from storage, where each transport aisle is associated with a separately controllable outfeed conveyor belt.

10. The method according to claim 1, where said containers are furthermore treated in a treatment unit arranged in a region of said buffer area and a length of time the containers dwell in said buffer is set by advancing and/or stopping said shuttles with said row pushers there receiving said containers.

11. A device for buffering containers grouped in a single row in a filling system, comprising a buffer area and a transport system arranged thereabove for moving said containers on said buffer area in a buffering direction, from an infeed region with at least a first infeed conveyor belt and a second infeed conveyor belt arranged consecutively in said buffering direction and running transversely to said buffering direction adjacent to a first end of the buffer area, to an outfeed region with at least one outfeed conveyor belt running transversely to said buffering direction adjacent to a second end of the buffer area, opposite to the first end, where said transport system comprises shuttles guided on rails and driven independently with row pushers aligned transversely to said buffering direction for moving said containers in said single row, where said row pushers each comprise a guide channel running transverse to said buffering direction for receiving said containers in said single row, where said guide channel is defined by an anterior row guide leading said containers and a posterior row guide trailing said containers, and where said device further comprises a track switch for separating a flow with said containers into single-row groups of containers and their alternating allocation to said first infeed conveyor belt and said second infeed conveyor belt.

12. The device according to claim 11, where said shuttles comprise actuating mechanisms for adjusting a clear width between said anterior row guide and said posterior row guide.

13. The device according to claim 11, where said transport system comprises a stationary adjustment station for automated actuation of actuating mechanisms.

14. The device according to claim 11, where said row pushers have a width of 3 m to 6 m that is transverse to said buffering direction.

15. The device according to claim 11, where each shuttle comprises two row pushers arranged consecutively in said buffering direction.

16. The device according to claim 11, where said infeed region comprises several infeed conveyor belts arranged consecutively in said buffering direction.

17. The device according to claim 11, where the track switch is configured for separating a gapless flow with said containers into single-row groups of containers and alternating and temporally gapless allocation of said single-row groups of containers to said first infeed conveyor belt and said second infeed conveyor belt.

18. The device according to claim 17, further with differently long and/or fast transport paths between said track switch and said infeed conveyor belts, where a length of said individual transport paths differs from one another and/or a transport speed of said individual transport paths is adjustable differently such that said groups of containers allocated consecutively to said transport paths at said track switch arrive substantially simultaneously on said infeed conveyor belts.

19. The device according to claim 11, where at least one cleaning element for blowing onto, spraying onto, squeegeeing off, and/or brushing off said buffer area is arranged on at least one of said row pushers.

20. The device according to claim 11, where said buffer area comprises mat chains which run transversely to said buffering direction and are arranged in a stationary manner.

* * * * *